Figure 1:
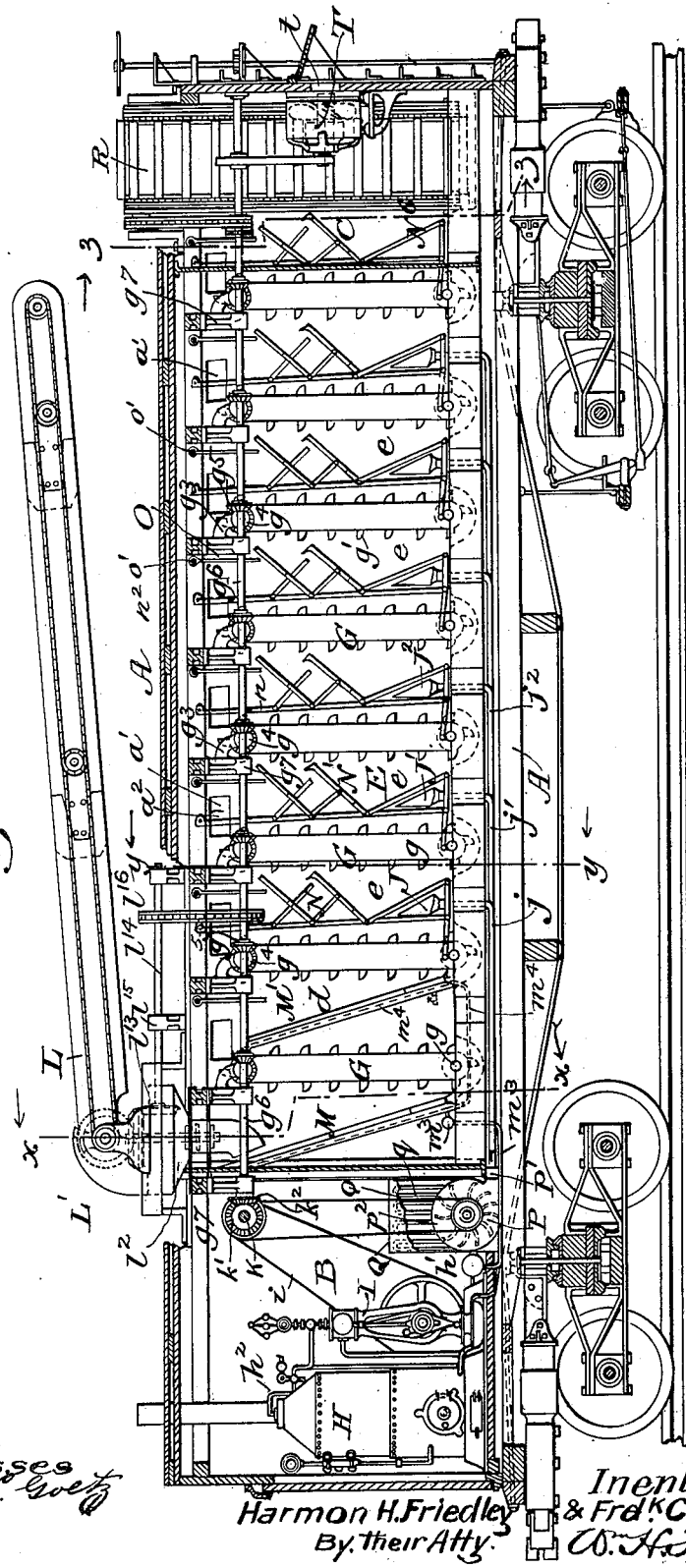

No. 659,732. Patented Oct. 16, 1900.
H. H. FRIEDLEY & F. C. CROWE.
PORTABLE APPARATUS FOR RENOVATING GRAIN.
(Application filed Feb. 2, 1899.)
(No Model.) 6 Sheets—Sheet I.

Witnesses
Inventors:-
Harmon H. Friedley & Fred. C. Crowe.
By their Atty.

No. 659,732. Patented Oct. 16, 1900.
H. H. FRIEDLEY & F. C. CROWE.
PORTABLE APPARATUS FOR RENOVATING GRAIN.
(Application filed Feb. 2, 1899.)
(No Model.) 6 Sheets—Sheet 2.
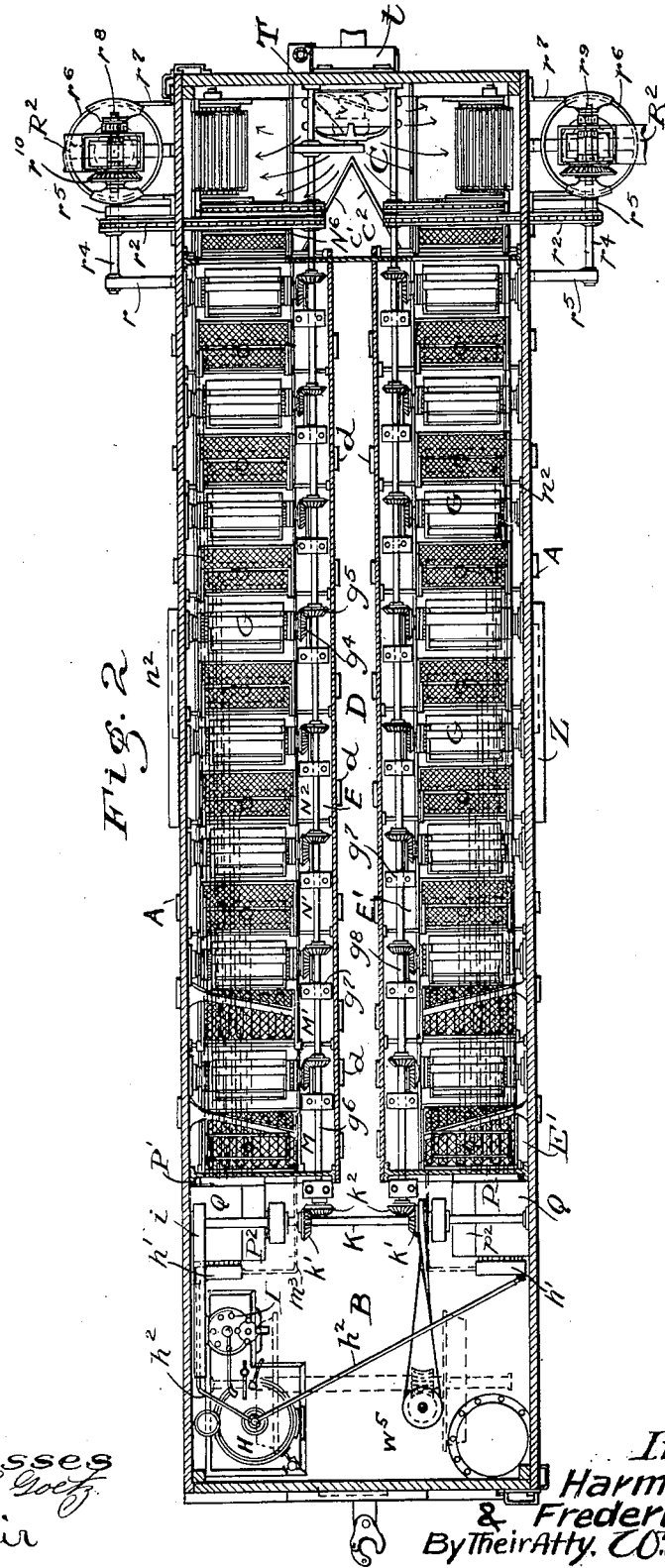
Witnesses
Inventors
Harmon H. Friedley
& Frederick C. Crowe
By Their Atty. Wm H. Rowe

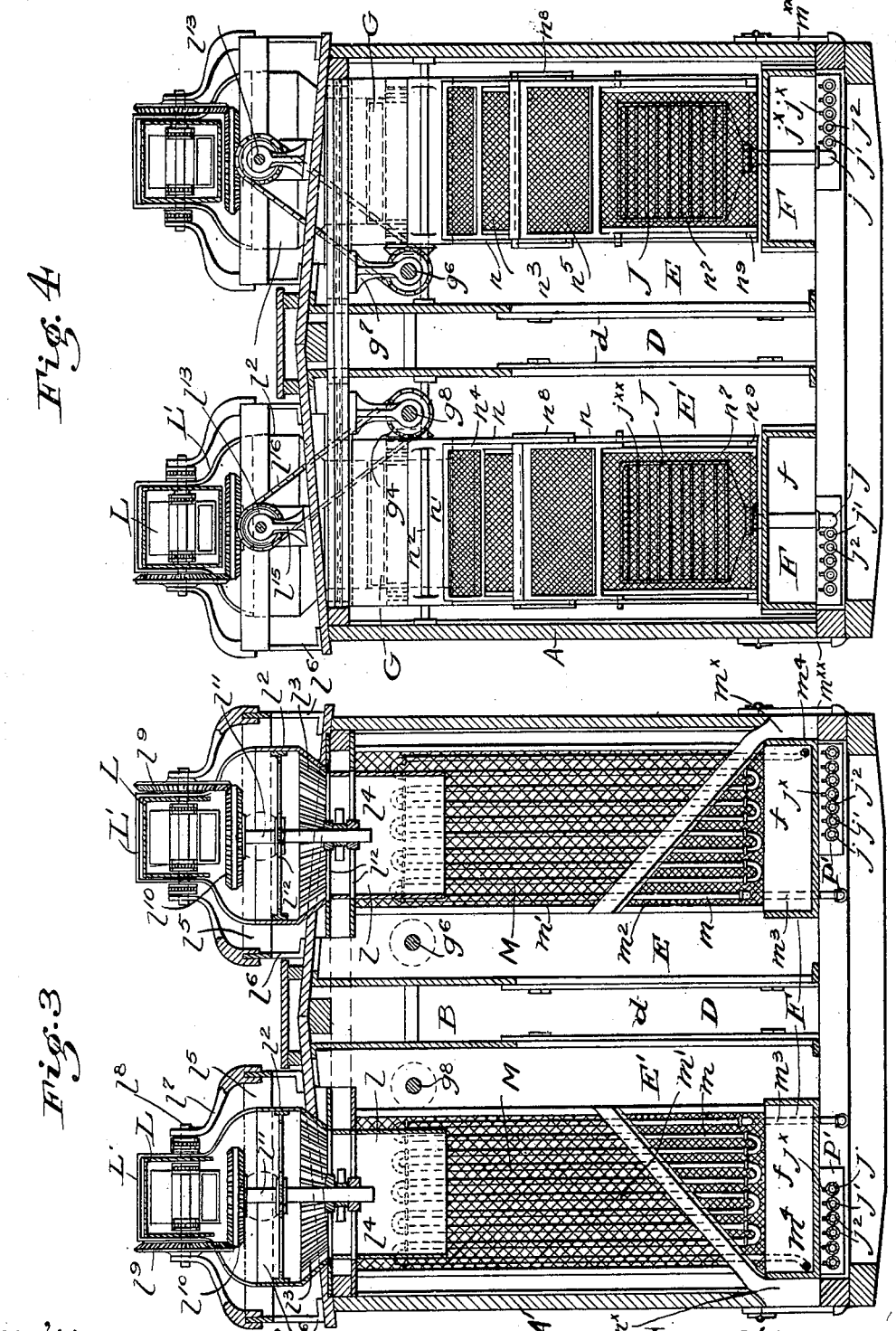

No. 659,732. Patented Oct. 16, 1900.
H. H. FRIEDLEY & F. C. CROWE.
PORTABLE APPARATUS FOR RENOVATING GRAIN.
(Application filed Feb. 2, 1899.)
(No Model.) 6 Sheets—Sheet 4.
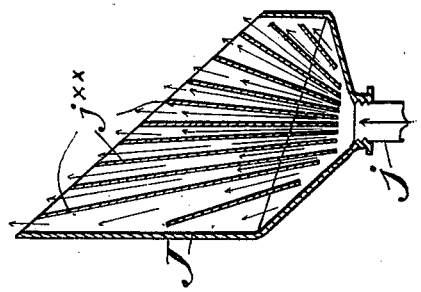
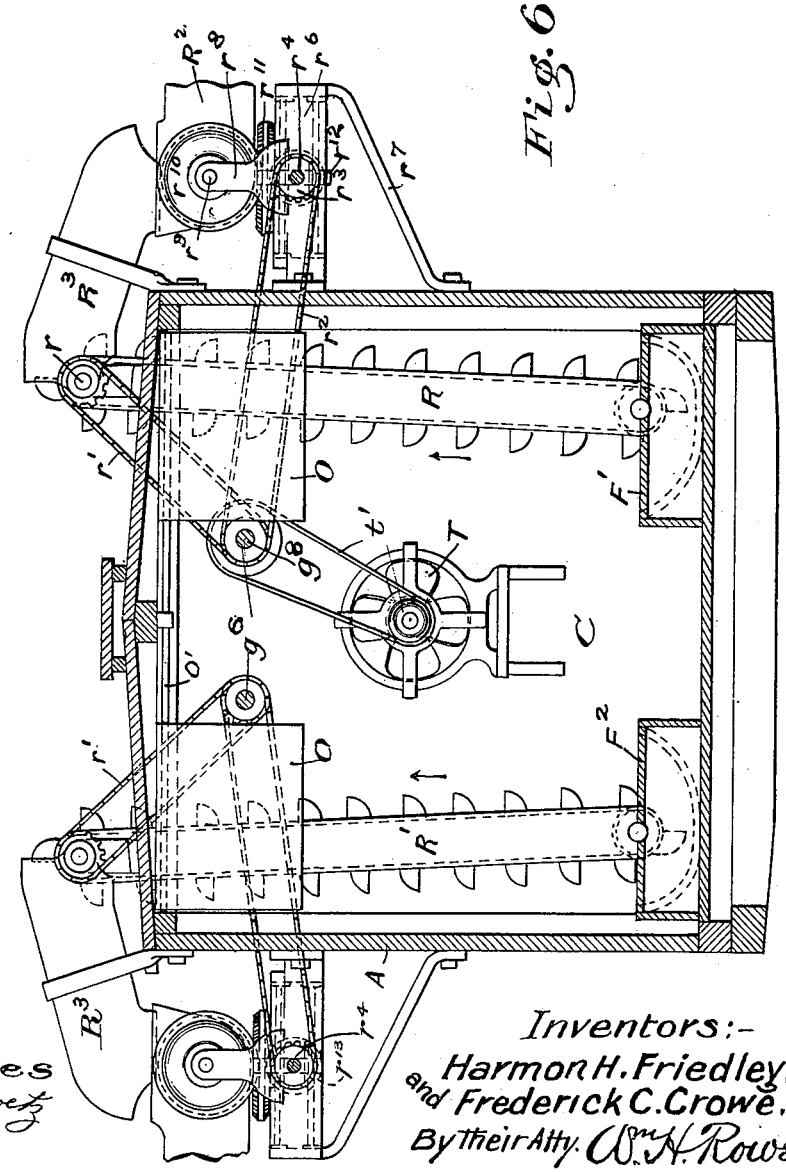
Witnesses
George L. Goetz
JB Weir
Inventors:—
Harmon H. Friedley,
and Frederick C. Crowe.
By their Atty. W. H. Rowe.

No. 659,732. Patented Oct. 16, 1900.
H. H. FRIEDLEY & F. C. CROWE.
PORTABLE APPARATUS FOR RENOVATING GRAIN.
(Application filed Feb. 2, 1899.)
(No Model.) 6 Sheets—Sheet 5.
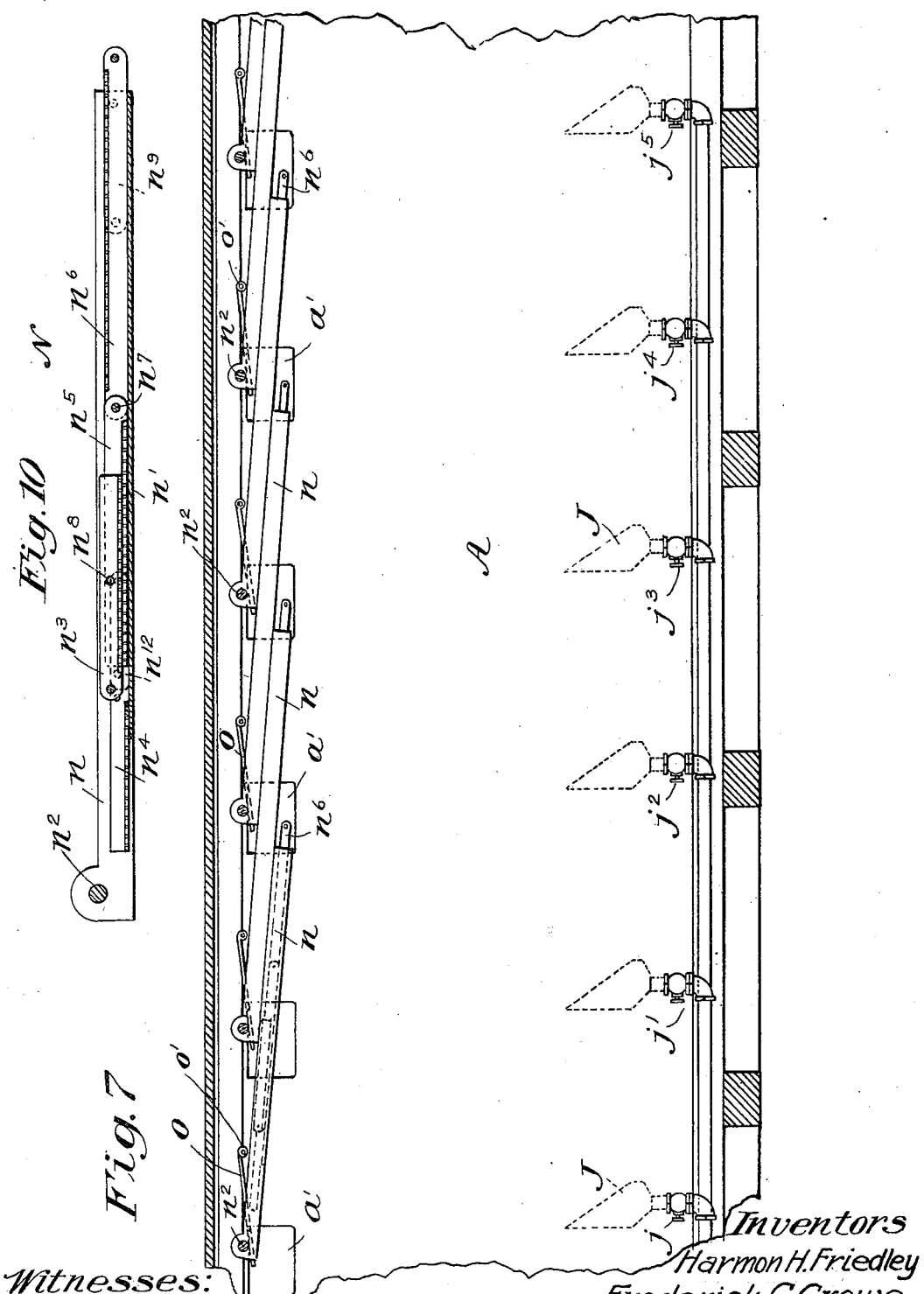
Witnesses:
C. H. Schafer
Geo. M. Mayer
Inventors
Harmon H. Friedley
Frederick C. Crowe
By their Atty: Wm. H. Rowe No. 659,732. Patented Oct. 16, 1900.
H. H. FRIEDLEY & F. C. CROWE.
PORTABLE APPARATUS FOR RENOVATING GRAIN.
(Application filed Feb. 2, 1899.)
(No Model.) 6 Sheets—Sheet 6.
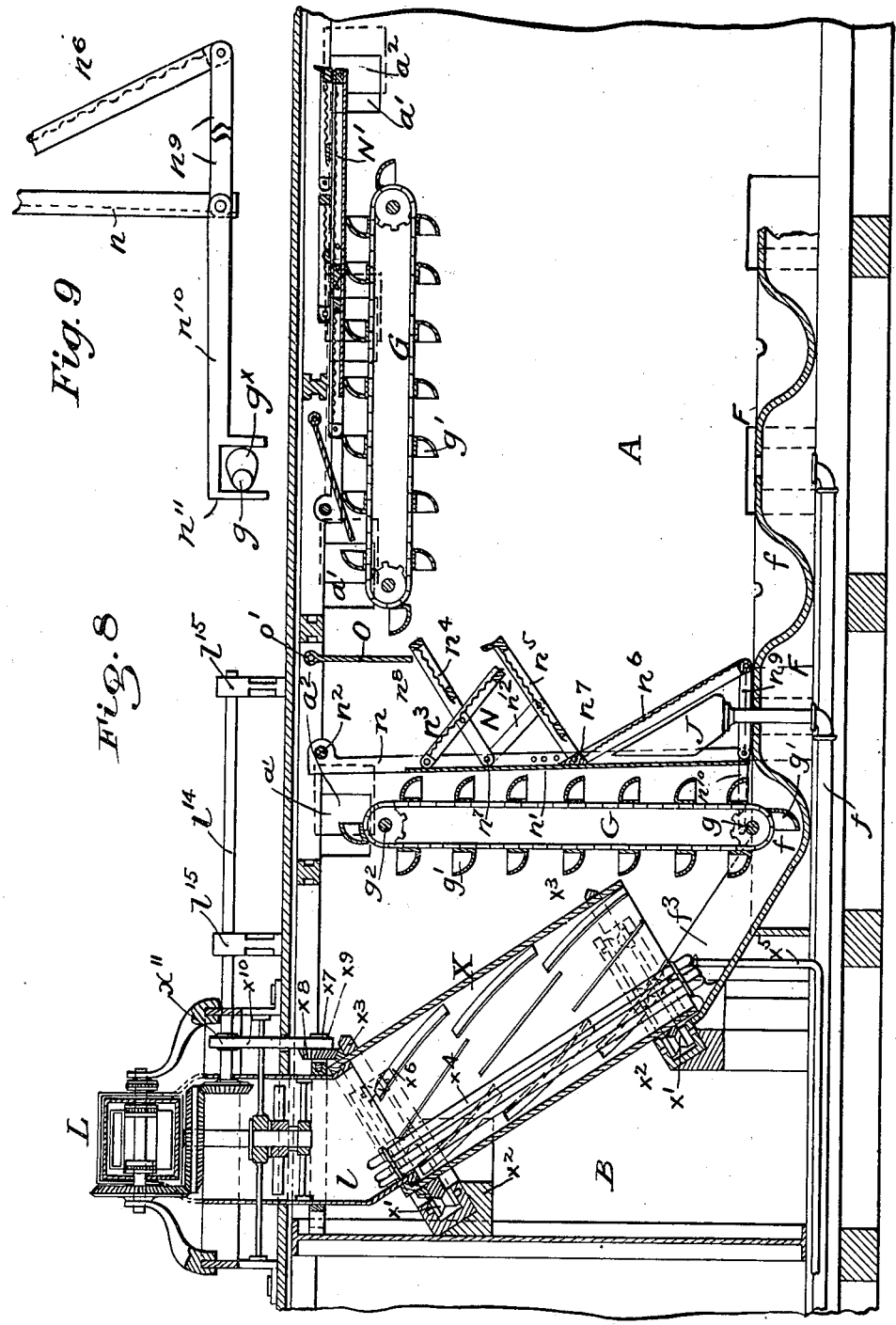
Inventors:-
Harmon H. Friedley
and Frederick C. Crowe,
By their Atty. W. H. Rowe

UNITED STATES PATENT OFFICE

HARMON H. FRIEDLEY, OF INDIANAPOLIS, INDIANA, AND FREDERICK C. CROWE, OF CHICAGO, ILLINOIS.

PORTABLE APPARATUS FOR RENOVATING GRAIN.

SPECIFICATION forming part of Letters Patent No. 659,732, dated October 16, 1900.

Application filed February 2, 1899. Serial No. 704,322. (No model.)

*To all whom it may concern:*

Be it known that we, HARMON H. FRIEDLEY, of Indianapolis, county of Marion, and State of Indiana, and FREDERICK C. CROWE, of Chicago, county of Cook, and State of Illinois, have invented certain new and useful Improvements in Portable Apparatus for Renovating Grain, of which the following is a specification.

One object of our invention is, primarily, to provide an apparatus especially designed for renovating grain or other material which has been damaged by fire, wreckage, or exposure to storms or by casualities which have damaged the grain or other material.

A further object of our invention is to adapt an apparatus of the kind stated for transitory use either upon a car or vessel which may be transported to the place of action, as to the railroad-tracks or wharfage of an elevator or to within close proximity to the ruins of a fire or to location to be used, the said car or vessel containing the renovating apparatus being also preferably provided with suitable conveyers and auxiliary appliances for handling the grain and delivering it to the renovating-cars from the bins or piles of the ruins or wreckage.

A further object of our invention is to so construct the renovating apparatus that it may be readily adapted, first, for passing the grain over any required distance or surface over which the renovation is conducted; second, to subdivide the apparatus into sections which may be used either for carrying and treating at one operation grain of various grade of deterioration or to increase the capacity of the apparatus, and, third, to so construct the grain-renovating apparatus that either a part or all of it may be placed for a time out of the way to allow space within the car for the use or erection of supplemental apparatus ordinarily applied for treating grain or for renovating any other material which may be found in the wreckage or for any other reason the space be required for another purpose.

Our invention consists in certain devices especially adapted to successfully carry out the objects of the invention as above stated or other objects incident thereto and not specifically enumerated herein, the novel features being hereinafter particularly described with reference to the accompanying drawings and set forth in the claims.

In the drawings, Figure 1 is a longitudinal sectional elevation of a railroad-car equipped with our improvements; Fig. 2, a plan view of the same; Fig. 3, a vertical transverse section in line $x\ x$ of Fig. 1 upon an enlarged scale, showing the steam-pipe and double screen-sections over which the grain is first passed; Fig. 4, a similar view in line $y\ y$ of Fig. 1, showing in elevation the zigzag screens over which the grain is passed after it leaves the screen-sections shown in Fig. 3; Fig. 5, a similar view on line $z\ z$ of Fig. 1, on an enlarged scale, showing the belt conveyers for discharging the grain after it has been dried or treated from the car; Fig. 6, an enlarged transverse section of one of the blower-nozzles in detail; Fig. 7, an enlarged sectional view of a part of a car-body with the partition back plates and screen-frames swung up against the roof of the car; Fig. 8, an enlarged longitudinal section of a part of a car-body, showing a cylindrical conduit of novel construction through which the grain may be conducted when it first enters the apparatus and also showing, upon an enlarged scale, one of the belt conveyers and one of the zigzag screens in an upright position and a second conveyer and zigzag screen in an elevated horizontal position, when in the last-named position leaving a clear space within the car when the said conveyer and screen are not in use. Fig. 9 is a side elevation of the lower part of the screen-frame, showing the means for shaking it; and Fig. 10, an enlarged section of the pendulous back plate and its hinged screen folded thereon.

The car-body A has a receiving-end compartment B and a discharge-end compartment C, said compartment being connected by a passage-way D, upon opposite sides of which are located drying-chambers E E', extending the full length of the passage-way and from one end compartment to the other, the said chambers being subdivided into numerous sections $e$ by upright screen and conveyer sections, as will hereinafter appear. The screen-sections are placed substantially at equal distances from each other in close proximity to the next preceding conveyer from which the grain is received, and each sectional compartment immediately in front of each screen-section has a door $d$ leading from the passage-way D to give access to each sectional compartment, whereby the screen and the condition of the grain passing over them may be readily inspected.

The floor of each sectional compartment of the drying-chamber is fitted with a continuous series of box-sections F, each having a trough $f$, into which the lower end of a conveyer G is fitted, the lower shaft $g$ thereof being held in bearings upon said box-sections to allow the buckets $g'$ of the conveyer to dip the grain therefrom and elevate it to the head of the next succeeding screen, the upper shaft $g^2$ of the conveyer being supported by brackets $g^3$, secured to the roof-frame of the car, and the inner end of each of said conveyer-shafts has a miter-wheel $g^4$, which gears with a like wheel $g^5$ upon a line-shaft $g^6$, which extends the full length of the passage-way D upon one side thereof and to one end of the car and is supported by brackets $g^7$, secured to the roof-frame of the car, all of the conveyers upon one side of the car being operated thereby, a similar line-shaft $g^8$ being located parallel to the shaft $g^6$ upon the opposite side of the passage-way to operate the conveyers upon the corresponding side of the car. The receiving-end compartment B of the car contains a steam-boiler H and an engine I, from which a belt $i$ drives a main transverse shaft K, having bevel-gears $k'$ secured thereto, which engage with like gears $k^2$ upon the adjacent ends of the line-shafts $g^6$ and $g^8$, which thus drives the conveyers, pulleys of any preferred size being employed to give the required speed to the conveyers.

A conveyer L, supported in a novel manner at the receiving end of the car, delivers the grain, as will hereinafter appear, through a spout $l$ to the head or upper end of the first of a series of steam-pipes and double-screen drier-sections M, which serve to rapidly carry off and precipitate any liquid or water which will drain from the grain and also warm the grain and separate therefrom both bulky material—such as chips or pieces of coal, stone, or cinder—the grain being carried over a set of longitudinal steam-pipes $m$, running lengthwise of the drier-section M between a coarse screen $m'$, which carries off the aforesaid bulky material, and a fine screen $m^2$, through which fine refuse escapes and over which the grain slides and is emptied into the trough $f$ of the first one of the box-sections F, the drier-section M being inclined at a suitable angle to deliver the grain to the trough. The lower end of the upper coarse screen $m'$ is cut away at an angle from the inner side to the lowermost outer corner and is secured to a spout $m^\times$, which discharges the coarse material carried off by the screens to the enlarged pocket at the lower end of the spout which leads to a door $m^{\times\times}$ in the side of the car, similar doors opposite each of the drier-sections providing means for removing the light dust which passes through the screens from the floor between the troughs. Two of the steam-pipe double-screen drier-sections M and M', respectively, are shown on the drawings, although any required number may be employed. The steam-pipes $m$ of the section M are connected by a pipe with a header $h'$, supplied by a steam-pipe $h^2$ from the boiler H, and the steam-pipes $m^4$ of the section M' are supplied by a pipe $m^3$ from the header $h'$, suitable stop-cocks being applied to the said pipes to regulate the admission of steam thereto and suitable drain-cocks being also provided to allow the water of condensation to escape therefrom in any well-known or preferred manner. After the grain has been thoroughly drained, screened, and sufficiently warmed it is delivered by the conveyer to the upper end of the first of a series of upright zigzag screen-driers N, which consist of pendulous side bars $n$, connected by a back plate $n'$ and pivoted to a cross-rod $n^2$ at the upper ends thereof, the ends of the said rod $n^2$ being supported in the longitudinal frame-pieces $a$ of the roof of the car, as shown in enlarged sectional elevation, Fig. 8, the side bars when in their working position being held upright and when not in use being held in a horizontal position, thus to clear the drying-chamber when circumstances require it.

A series of screens $n^3$, $n^4$, $n^5$, and $n^6$, arranged in a zigzag manner, are pivoted at one end to the side bars $n$ by cross-bolts $n^7$, which pass through holes in the said bars and may be thereby adjusted thereon to vary the angle of the screens when desired to cause the grain to flow more or less rapidly over the surface thereof.

The screen $n^3$ is covered its full length by a wire-netting and crosses the screen $n^4$, a bolt $n^8$ connecting them, and the outer end only of the screen $n^4$ is covered with netting to within a short distance of the upper surface of the screen $n^3$, thus to provide a hopper-shaped screen-surface at the upper end of the drier-section into which the grain is emptied by the conveyer, the grain passing between the said screen at the angle thereof and passing down over the long screen to the head of screen $n^5$, which carries it inwardly to the head of screen $n^6$, which is inclined outwardly or away from the back plate of the drier and delivers the grain into the trough $f$ of the box-section F, from whence it is again lifted by the conveyer of the next section. Links $n^{12}$ support the screen $n^5$ and links $n^9$ support the screen $n^6$ in their inclined positions, and as all of the connections are flexible the angle of the screens may be readily changed by removing the cross-bolts $n^7$ and placing them in any one of the holes of the side pieces.

An arm $n^{10}$, as shown in Fig. 8 and in detail in Fig. 9, extends horizontally and rearwardly from the lower end of one of the pendulous side bars $n$ and has a fork $n^{11}$ at the rear end thereof to straddle a cam $g^\times$, secured to the lower shaft $g$ of the conveyer G, thus to shake the screen-driers N and facilitate the operation of screening and carrying the grain in a tremulous wave over the surface of the screens. A fender or dash-plate O is pivoted by a cross-bolt $o'$ to the roof of the car and hangs pendulously therefrom in front of the upper end of each conveyer to receive the splash of the grain as it is thrown over by the cups of the conveyer and deflect it downwardly to the screens. A blower-nozzle J J' $J^2$, &c., located one under each of the screens $n^6$ of the several screen-sections, is connected, respectively, by pipes $j\,j'\,j^2$, &c., with the header $p'$ of the fan P, located in the compartment B of the car, the casing $p^2$ of said fan receiving hot air from a heater Q, and the steam-pipes $q$ of the heater is connected by a steam-pipe through a header $h'\,h^2$ with the boiler H, a suitable stop-cock being fitted thereon, suitable stop-cocks $j^\times$ at the ends of the pipes $j\,j'\,j^2$, &c., serving to regulate, respectively, the hot air admitted to the heater and the hot air admitted to the several hot-air pipes and nozzles of the zigzag-screen drying-sections.

The blower-nozzles I are fan-shaped and may have transverse deflecters $j^{\times\times}$ therein to direct the hot air over the entire surface of the screens, as shown on Figs. 6 and 4 of the drawings, thus giving to each part of the screen an independent air-conduit.

Ventilator-windows $a'$ are made in the side of the car opposite and at the upper ends of each drier-section and have shutters or slides $a^2$, which may be opened or closed to regulate the temperature of each section and provide means for the escape of vapor, steam, or light refuse blown off from the grain.

The last of the series of driers $N^6$ is located in the discharge-end compartment C of the car and delivers the grain into the trough $f$ of the box F', from which a conveyer-lift R discharges the grain through the roof at the end of the car into the spout of a conveyer $R^2$, by which means the grain is carried when completely dry away from the car and when not completely dry to the receiving end of the drying-chamber E' at the opposite side of the car. The conveyer-lift R' at the discharge end of the car which receives the grain from the said drying-chamber E', being the counterpart of the conveyer-lift R, will then deliver the grain where required.

The fan-blower T in the compartment C receives air from a shutter-controlled aperture $t$ in the end of the car and is driven by a belt and pulleys $t'$ from the end extensions of the line-shafts $g^8$, which operates the several conveyers of the drier-sections. Cold air is thus driven against the screens of the last drier $N^6$ within the inclosed chamber C, deflector-plates C' $C^2$ in front of the fan serving to deflect the cold air across the screens up opposite sides of the car and through the falling grain thereon to cool it before it is delivered from the drying apparatus.

The upper shafts $r$ of the conveyer-lifts R and R' are driven from the ends of the line-shafts $g^6\,g^8$ by link-belts $r'$ at the delivery end of the car, and link-belts $r^2$ connect the said line-shafts with sprocket-wheels $r^3$, secured to the driving-shaft $r^4$ of the delivery-conveyers, as clearly shown in Fig. 5, the driving-shafts $r^4$ being supported upon bearings in brackets $r^5$, secured to the outer sides of the car. A circle-track $r^6$ is secured by brackets $r^7$ to the car-body and a rotatable bearing hopper-frame $r^8$, to which the delivery-conveyer $R^2$ is attached by a shaft $r^9$, supported in said frame and carries the upper end of the conveyer-belt. The shaft $r^9$ is driven by a planetary wheel $r^{10}$, gearing with a two-faced bevel-wheel $r^{11}$ upon a vertical shaft $r^{12}$, centrally supported in spider-bearings in the circle-track and driven upon its under face by a bevel-pinion affixed to the shaft $r^4$, the latter being driven, as hereinafter described, from the line-shaft within the car. The delivery-conveyer $R^2$ may thus be raised, lowered, and swung to any required working position and the conveyer-belt driven without disconnecting the said conveyer head or hopper from the spout $R^2$, which connects it with the conveyer-lift R at the end of the car.

The conveyer L at the receiving end of the car is supported in a similar manner upon the top of the car and may be swung completely around a rotary hood L' to deliver the grain into a hopper $l^2$, which passes through the car-roof. A conical corrugated skirt $l^3$ within the hopper $l^2$ leads to a flat-mouth spout $l^4$, which opens toward the upper end of the head of the first drier-section. A circular track $l^5$ is secured by brackets $l^6$ to the roof of the car and supports the bracket-frame $l^7$, which provides bearings for the drive-shaft $l^8$ of the conveyer L, thus providing a rotatable support for the upper end of the conveyer. The shaft $l^8$ of the conveyer carries a planetary gear $l^9$, which is driven by a double-faced bevel-gear $l^{10}$, secured to a vertical shaft $l^{11}$, which is supported in spider-bearings $l^{12}$ of the hopper. A pinion $l^{13}$ upon the end of a counter-shaft $l^{14}$, supported in brackets $l^{15}$ upon the top of the car, engages the lower face of double-bevel gear $l^{10}$, and the said counter-shaft is operated by sprocket-wheels and a shaft connecting it with the conveyer line-shaft $g^6$ within the car. The receiving-conveyers may thus be driven and turned in any direction and the conveyers lengthened or shortened in any well-known or preferred manner to conduct the grain from the bin or from any place adjacent to the track into the hoppers at the receiving end of the car.

The spout of the lower end of the receiving-hood, as shown in Fig. 8, passes into the open end of a rotatable cylinder $x$, which extends downwardly to a spout $f^3$, leading to the trough $f$ of the first drier-conveyer, and is supported upon grooved rollers $x'$ in the bead $x^2$, properly secured to the frame of the car and a V-shaped ring $x^3$ at each end and upon the outer side of said cylinder resting in grooves in the rollers $x'$, thus preventing endwise movement of the cylinder. A series of steam-pipes $x^4$, connected by a pipe $x^5$ with the boiler, are heated thereby and provide a hot surface of any required area, over which the grain may first be passed before it is delivered to the driers. The inner surface of the cylinder $x$ is provided with wings $x^6$, which may be set to any required angle to obstruct or hinder the downward movement of the grain within the cylinder. The upper ring $x^3$ of the cylinder has a beveled gear $x^7$ upon its upper face, which engages with a pinion $x^8$, supported upon a shaft $x^9$, having bearings supported upon the roof-frame, the said gear $x^8$ having a pulley-hub to carry a belt $x^{10}$, driven by a pulley $x^{11}$ on the countershaft $l^{14}$, from which the receiving-conveyer L is operated. The cylinder may be arranged, as shown on Fig. 8, to deliver the wet or sodden grain first to the conveyer of the zigzag screen-sections or to the conveyer of the steam-pipe screen-sections, (shown in Fig. 3,) as it is essential that the grain be dried out sufficiently to roll freely over the screens of the zigzag sections before it is delivered to them.

The apparatus hereinbefore described constitutes a salvage-car, which may be quickly transported in close proximity to the scene of the wreck or fire, as a warehouse, mill, or elevator where grain is stored have tracks leading to them, and by means of the sectional extension conveyers adapted to be swung in any required position while attached securely to the end of the car the grain may be reached and conducted over intervening obstacles from the pile or bins to the hopper, which delivers it to the head of one of the sets of driers upon one side of the car, and if the grain is not too wet a second similar conveyer may be employed to carry the grain to the head of the set of conveyers on the opposite side of the car. If the grain is so wet that it will not be thoroughly dried and heated by the first set of conveyers, it may be carried by the conveyer at the delivery end of the car to the receiving end of the opposite set of apparatus, and thus conducted through a second or continued process of drying and treatment back and forth until the treatment and drying process is complete. The various steam and hot-air pipes, together with the ventilation-openings, will provide means for regulating and controlling the temperature of the apparatus at all points from one end of the car, and the passage extending from one end compartment to the other end compartment of the car, with a door leading to each set of the apparatus located in the drying-chambers upon either side of the passage, provides means by which all parts of each apparatus may be readily adjusted, inspected, cleaned, and repaired.

The special devices employed for drying and cleaning possess obvious advantages over ordinary driers and cleaners when employed within the contracted limits of a car and are especially adapted to be connected together in series, by means of which the dripping of sodden grain may be first treated by special devices, which quickly render it sufficiently dry to roll without clogging over screens, which are set at such angles that the grain will be sufficiently retarded in its passage over them to be thoroughly, gradually, and uniformly dried.

The cooling apparatus is especially designed to reduce the temperature of the grain thus treated to the temperature required while in transit and immediately before it is delivered from the car, the grain being moved continually from the time it enters until it leaves the car.

By the simple device shown the car may be moved about along the tracks to the immediate location required or pushed onto a side track without employing a locomotive-engine for such purpose.

The special mechanism employed for conveying and treating the grain may be swung up out of the way and folded beneath the roof of the car when the space within the car is required for drying other material damaged by water—such as clothing, dry goods, and other stuff—which may be placed in the several compartments immediately above the hot-air nozzles and below the ventilating-apertures at the side and top of the car.

All of the conveyers, both outside and upon the inside of the car, may be easily taken down and stored away and may be used as supplemental conveyers should they be thus needed.

We claim as our invention and desire to secure by Letters Patent—

1. Traveling apparatus for renovating grain and the like purpose, comprising a railway-car with its running-gear, adjustable, external collecting apparatus carried by the car at one end, adjustable external discharging apparatus carried by the car at the other end, a power-compartment at the receiving end, a boiler and engine in said power-compartment an aisle running lengthwise of the car, a series of drying and screening apparatus with intermediate elevators arranged alongside of said aisle and partitioned off therefrom, means for inspecting each individual apparatus from the aisle, an elevator at the discharging end of the car, receiving from the last of said apparatus, and delivering to the external discharging apparatus, and a shaft running lengthwise of the car driven by the engine in the power-compartment and driving the successive apparatus.

2. Traveling apparatus for renovating grain and like purposes, comprising a railway-car with its running-gear, means at one end thereof for collecting and conveying into the car material collected from external sources to be operated upon by apparatus within the car means at the other end thereof for discharging and delivering the material operated upon to an external point, a power-compartment at the receiving end and containing a boiler and engine, an aisle running lengthwise of the car, a series of drying and screening apparatus with intermediate elevators arranged alongside the aisle and partitioned off therefrom, spouts leading to the exterior for conducting away the tailings of the successive apparatus, an elevator at the discharge end of the car, delivering to the external discharging apparatus, and a line-shaft running lengthwise of the car, driven by the engine, and driving the successive apparatus, whereby material is received at one end of the car, dried, cleaned and discharged in one continuous operation.

3. Traveling apparatus for renovating grain and like purposes, comprising a railway-car with its running-gear, an external swingable and adjustable receiving or gathering conveyer on top and at one end thereof, an external swingable and adjustable discharging conveyer at the other end thereof, a steam boiler and engine located in a power-compartment at the receiving end of the car, a shaft running lengthwise of the car and driven by said engine, a series of drying and screening apparatus down one side of the car, with intermediate elevating-conveyers driven by said shaft, an aisle lengthwise of said car, communicating with each individual apparatus by doors, a cooling-apartment at the delivering end of the car, and an elevating-conveyer thereon, also driven by said shaft and receiving from the last of said apparatus and delivering to the discharging-conveyer.

4. Traveling apparatus for renovating grain and like purposes comprising a railway-car, with its running-gear, means at one end for collecting and conveying into the car material to be operated upon from external sources, means at the other end for discharging and delivering the material operated upon to an external point or points, a power-compartment at the receiving end, a cooling-compartment at the delivering end, a closed drying and cleaning compartment running longitudinally of the car, a passage-way alongside of said longitudinal compartment, means for inspecting each of said apparatus from the passage-way, a cold-air fan located in the cooling-compartment, a discharging apparatus, a steam boiler and engine located in the power-compartment, a line-shaft driven by said engine and driving the successive apparatuses, and a heater and hot-air fan also located in said power-compartment, and delivering a hot-air blast or blasts to the longitudinal drying-compartment and to the drying apparatus therein.

5. Traveling apparatus for renovating grain and like purposes comprising a railway-car with its running-gear, means at one end for collecting and conveying into the car material to be operated upon, means at the other end for discharging and delivering the material operated upon to an external point or points, a power-compartment at the receiving end, a cooling-compartment at the delivering end, a closed drying and cleaning compartment running longitudinally of the car and divided into transverse sections, a passage-way alongside of said longitudinal compartments, a series of drying and screening apparatuses, arranged in the successive sections of said compartments, and intermediate elevators delivering from one section to the other, doors to each of the sections, opening to the parallel passage-way, ventilators to each section opening to the top and exterior of the car, a cold-air fan located in the cooling-compartment, a discharging-elevator also located in said compartment and delivering to the external discharging apparatus, a heater and hot-air fan, located in the power-compartment, and delivering a hot-air blast or blasts to the longitudinal drying-compartment and to the drying apparatus therein, a steam boiler and engine also located in the power-compartment and driven by the engine and driving the successive apparatuses.

6. Traveling apparatus for renovating grain and the like purpose, comprising a railway-car with its running-gear, a conveyer at one end for collecting material from external sources, a power-compartment at said end, two longitudinal closed, drying and cleaning compartments, extending lengthwise of said car from said power-compartment, on each side of a central passage-way, series of drying and screening apparatus with intermediate elevators arranged in each of said longitudinal compartments, an elevator at the farther end of the car, receiving from the first series, an external conveyer to which said elevator delivers means whereby said conveyer may be caused to deliver to, the second series adjacent to the power-compartment, a second elevator receiving from second series at said farther end, an external conveyer receiving from said elevator, means whereby said conveyer may be swung to deliver to a suitable external point a boiler and engine in the power-compartment, and gearing whereby said engine drives the successive mechanisms.

7. Traveling apparatus for treating grain comprising a railway-car with its running-gear, a power-compartment at one end thereof, a boiler and engine therein, a longitudinal line-shaft driven from said engine, a series of grain-treating apparatuses with intermediate removable elevator-belts arranged longitudinally of the car, transverse overhead shafts driven by said line-shaft, and driving said apparatuses and elevator-belts a series of pendulous folding screen-supporting frames hung from said transverse shafts, and upon which said screen-supporting frames are adapted to be folded, and a series of removable box-sections whereby the screen-supporting frames may be swung up toward the roof of the car and the floor cleared when desired for other purposes.

8. An apparatus for drying material damaged by fire or wreckage, comprising a portable body having a power and heat generating apparatus located at one end thereof, a series of separate compartments and grain elevating and drying devices arranged in sets one following the other alternately therefrom, and having partitions between them a series of nozzles, one adapted for each compartment and separate valve-controlled pipes connecting said nozzles to the heat-supply at the end of the car, substantially as described.

9. An apparatus for drying grain damaged by water comprising a portable body having a heat and power supply, a series of separate drying chambers or compartments extending successively within said body, nozzles and separate valve-controlled pipe connections leading from the heat-supply to the bottom of each compartment, ventilators at the top of each compartment, drier-sections over which the material passes by gravity, an elevator operated by said power-supply for elevating the material from the foot of one of said drier-sections to the head of the next succeeding drier-section located in each of said compartments, substantially as described.

10. An apparatus for drying grain damaged by water comprising a portable car-body, compartments located at opposite ends thereof to receive the grain stored and deliver it at the other end of the car, drying-chambers between the end compartments the power-supply located in one of the end compartments, the receiving and delivering conveyers connected respectively within said drying-chambers and a passage-way between said chambers dividing the car into two oppositely-disposed sections extending from one end compartment to the other to allow access to any part of said drying-chambers from either end of the car, and a series of driers and conveyers for conducting the grain through the drying-chamber sections, substantially as described.

11. An apparatus for drying grain, a car comprising drying apparatus connected together in two series located upon opposite sides of the car-body, a receiving or gathering conveyer at one end of the car, external discharging-conveyer at the other end of the car, adapted to be connected to the opposite end of the car for conducting the grain to be dried from the discharge end of one series to the receiving end of the other series, substantially as described.

12. In apparatus for drying grain, the combination with inclined drier-pipes over which the grain passes, screens located above said pipes for separating coarse stuff from the grain and screen located below said pipes over which the grain passes to allow the fine refuse to pass from the grain substantially as described.

13. An apparatus for cleaning and drying grain comprising a drying-chamber, a series of pendulous vibratory upright back plates and a series of zigzag frames having screen-surfaces thereon secured to the back plate to provide a series of shaking-screens, a grain-receptacle at the foot of the back plates and screens, a conveyer connecting the said grain-receptacle and adapted to deliver the grain over the top of the next succeeding partition back plate and second set of screens, substantially as described.

14. An apparatus for cleaning and drying grain comprising a perpendicular frame supporting a back plate a series of zigzag screens projecting therefrom, and a blast-pipe located below the bottom screen having a fan-shaped discharge-nozzle for spreading the blast evenly beneath the lower screen, substantially as described.

15. In an apparatus for drying grain, the combination with the upright partition back plate pendulously supported at its upper end a series of shaking zigzag screens projecting laterally therefrom, a cam-shaft and means for connecting the pendulous partition back plate with the cam-shaft to support and vibrate said pendulous plate, substantially as described.

16. In an apparatus for drying grain, a car-body having drying-chambers, means for treating and conveying the grain through the same to the end of the car, a conveyer-lift to discharge the grain at the top of the car, and a conveyer supported to swing upon the car to receive the grain from the lift and rotate around the upper discharge end thereof and carry it in different directions therefrom, substantially as described.

17. In a car for treating grain, an apparatus for drying screening and conveying grain from the receiving end to the delivery end thereof, a hopper passing through the car-roof to said apparatus, a circular track surrounding the hopper secured to the car-roof, a revolving gear and gear-frame supported upon the track and a conveyer driven therefrom and pivotally supported thereon concentrically to the track, substantially as described.

18. A car for treating grain comprising an apparatus for drying and conveying the grain from the receiving to the delivery end, a longitudinal shaft for driving said apparatus, a hopper and circular track supported upon the roof of the car at the receiving end thereof, a conveyer supported upon said track, a gear concentric with the track connected to the conveyer for operating it, and a counter-shaft geared thereto and driven by the said longitudinal shaft, substantially as described.

19. The combination with a car for treating grain, of a hopper at one end and passing through the car-roof, a track encircling said hopper, and a vertical drive-shaft and a bevel-faced double gear-wheel supported thereon concentric therewith, a driving-pinion engaging the lower face of the bevel-wheel, and a planetary gear-wheel engaging with the upper face of the bevel-wheel, a conveyer pivotally supported upon and driven by the said planetary gear-wheel and a bracket-frame for supporting said shaft upon the track, substantially as described.

20. The combination with a car for treating grain of a series of pendulous frames supporting apparatus over which the grain is conducted pivotally supported near the roof of the car, and adapted to be folded up out of the way when not in use, substantially as described.

21. The combination with a car for treating grain of a series of grain-drying apparatus, a series of upright conveyers and box-sections each having a trough to receive the lower end of a conveyer, the said sections forming a continuous floor beneath the apparatus which may be conveniently removed and replaced, substantially as described.

22. The combination with a car for treating grain of a series of separate compartments, grain-drying apparatus located within said compartments, a heating apparatus at one end of the car, and a series of pipes communicating from the heating apparatus separately to each of the said compartments, the pipes being each provided with a nozzle at the terminus, and with a stop-cock suitably connected therewith, substantially as described.

HARMON H. FRIEDLEY.
FREDERICK C. CROWE.

Witnesses:
WM. H. ROWE,
GEORGE L. GOETZ.